(12) United States Patent
Jaussaud et al.

(10) Patent No.: US 9,199,401 B2
(45) Date of Patent: Dec. 1, 2015

(54) INJECTION MOLD CORE FOR MAKING A PART OUT OF COMPOSITE MATERIAL, THE PART HAVING A CLOSED BOX

(71) Applicant: SNECMA, Paris (FR)

(72) Inventors: Raoul Jaussaud, Chavanay (FR); Marc-Emmanuel Techer, Paris (FR); Denis Pingon, Oyonnax (FR); Dominique Magnaudeix, Yerres (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/620,629

(22) Filed: Feb. 12, 2015

(65) Prior Publication Data
US 2015/0224693 A1    Aug. 13, 2015

(30) Foreign Application Priority Data

Feb. 13, 2014  (FR) ..................................... 14 51123

(51) Int. Cl.
| | | |
|---|---|---|
| *B29C 45/44* | (2006.01) | |
| *B29C 45/36* | (2006.01) | |
| *B29C 70/48* | (2006.01) | |
| *B29D 22/00* | (2006.01) | |
| *B29C 33/48* | (2006.01) | |
| B29L 31/00 | (2006.01) | |
| F01D 11/00 | (2006.01) | |

(52) U.S. Cl.
CPC ............... *B29C 45/36* (2013.01); *B29C 33/485* (2013.01); *B29C 70/48* (2013.01); *B29D 22/00* (2013.01); *B29C 45/44* (2013.01); *B29C 45/4435* (2013.01); *B29L 2031/7504* (2013.01); *B29L 2031/757* (2013.01); *F01D 11/008* (2013.01)

(58) Field of Classification Search
CPC ............................ B29C 45/44; B29C 45/4435
USPC ........ 425/577, 436 R, 438, 440, 441, DIG. 58
See application file for complete search history.

(56) References Cited

U.S. PATENT DOCUMENTS

| | | | |
|---|---|---|---|
| 3,067,467 A |   | 12/1962 | Yanush |
| 4,160,635 A | * | 7/1979 | Ikeda ......................... 425/436 R |
| 4,975,041 A | * | 12/1990 | Fries et al. ................ 425/436 R |
| 5,700,415 A |   | 12/1997 | Hiroki et al. |
| 6,235,231 B1 | * | 5/2001 | Martin ......................... 425/577 |

(Continued)

FOREIGN PATENT DOCUMENTS

| | | |
|---|---|---|
| FR | 889.416 | 1/1944 |
| JP | 8-183050 | 7/1996 |

OTHER PUBLICATIONS

French Preliminary Search Report issued Oct. 24, 2014, in Patent Application No. FR 1451123, filed Feb. 13, 2014 (with English Translation of Category of Cited Documents).

*Primary Examiner* — Tim Heitbrink
(74) *Attorney, Agent, or Firm* — Oblon, McClelland, Maier & Neustadt, L.L.P.

(57) ABSTRACT

The invention provides an injection mold core (100) for making a composite material part having a closed box, the core being in the shape of a wedge that is to be inserted inside a closed box (12) of at least one fiber preform into which a matrix-precursor fluid is to be injected, the core presenting both an opening right section (106) through which the core is to be unmolded from the box of the preform after the matrix has set, and also a maximum right section (108) of greater size than the opening right section, the core comprising at least three distinct elements (110, 112, 114) that are assembled together, each core element presenting a maximum right section of size that is smaller than the opening section.

5 Claims, 6 Drawing Sheets

(56) References Cited

U.S. PATENT DOCUMENTS

| | | | |
|---|---|---|---|
| 6,623,265 B1 * | 9/2003 | Day | 425/443 |
| 7,097,430 B2 * | 8/2006 | Harris | 425/438 |
| 2009/0160091 A1 * | 6/2009 | Zhu et al. | 425/577 |
| 2013/0181374 A1 | 7/2013 | Ender | |

* cited by examiner

INJECTION MOLD CORE FOR MAKING A PART OUT OF COMPOSITE MATERIAL, THE PART HAVING A CLOSED BOX

BACKGROUND OF THE INVENTION

The present invention relates to the general field of using a method of molding by injecting a liquid resin, known as resin transfer molding (RTM), for making a composite material part having a closed portion in the form of a box.

An example application lies with fabricating fan blade platforms out of composite material for an aviation turbine engine fan.

The fan blade platforms of a turbine engine, in particular of a turbojet, are arranged between the fan blades so as to extend the inlet cone of the fan. They serve in particular to define the inside of the annular air inlet passage into the fan, which passage is defined on the outside by a casing.

Document WO 2013/160584 discloses a method of making a fiber blank that is woven as a single piece by three-dimensional (3D) weaving for the purpose of fabricating a fan blade platform having a closed box under the base of the platform that serves to define the inside of the annular air inlet passage into the fan. The presence of a closed box thus serves to reinforce the mechanical strength of the blade platform.

Once such a fiber blank has been made, it is shaped so as to obtain a fiber preform. The fiber preform is then positioned in the cavity of an injection mold with a core (or mandrel) being placed inside the closed box of the preform. The cavity of the injection mold is then filled with epoxy resin in order to impregnate the preform. The resin is polymerized, thereby forming a matrix in which the preform is embedded, and then at the end of resin injection, the temperature of the mold is lowered in order to unmold the part.

In general manner, the step of unmolding the part is important and difficult to perform since the design of the injection tooling needs to include provision for means that facilitate unmolding the part and that are adapted to its shape. In the application to fabricating a fan blade platform, the main difficulty in unmolding the resulting part lies in extracting the core that is placed inside the box of the preform. The size of the opening section of the box through which the core is extracted is smaller than the maximum section of the core positioned inside the box. Given this difference in section size, it is not possible to extract the core from the box of the part.

OBJECT AND SUMMARY OF THE INVENTION

There therefore exists a need to be able to have an injection mold core for making a composite material part that has a closed box and that does not present the above-mentioned drawbacks.

To this end, the invention provides an injection mold core having the shape of a wedge that is to be inserted inside a closed box of at least one fiber preform into which a matrix-precursor fluid is to be injected, the core presenting both an opening right section through which the core is to be unmolded from the box of the preform after the matrix has set, and also a maximum right section of greater size than the opening right section, the core comprising at least three distinct elements that are assembled together, each core element presenting a maximum right section of size that is smaller than the opening section.

The core of the invention is remarkable in that it consists in an assembly of three distinct elements that are sufficiently rigid to enable the core to be placed inside the closed box of the preform into which matrix-precursor fluid is to be injected and to withstand the various off-centering forces and flank-deforming forces to which the box is subjected. Each of these elements presents a maximum right section of size that is smaller than the opening section of the core such that after the step of injecting matrix-precursor fluid into the mold, the core can be extracted from the mold by withdrawing the elements one after another. The core of the invention also makes it possible to ensure that the box is properly aligned in the injection mold.

In an embodiment, the elements of the core extend in the length direction of the core and they are assembled together by dovetails. Having recourse to dovetails for securing the elements of the core together greatly facilitates use and cleaning and makes it possible to provide effective protection against resin infiltration. Under such circumstances, each dovetail preferably comprises a tenon of trapezoid-shaped section carried by one of the elements of the core and a groove of complementary section formed in another element of the core.

When the core has a top element, a central element, and a bottom element that are assembled to one another, it is preferable for the central element to carry two tenons at one longitudinal end for co-operating with grooves formed respectively in the bottom and top elements, and for it to include two grooves at an opposite longitudinal end for co-operating with tenons carried respectively by the bottom and top elements.

In another embodiment, the elements of the core extend in the length direction of the core and they are assembled together by screws. Under such circumstances, the core may have two screws passing through the three elements of the core in the thickness direction of the core.

When the core has a top element, a central element, and a bottom element that are assembled to one another, it is preferable for the central element to carry two rectangular section rails that extend between the two longitudinal ends of the central element and that co-operate with guides of complementary shapes formed respectively in the bottom and top elements.

In yet another embodiment, the core comprises a top element, a bottom element, and a locking element, the bottom and top elements being assembled together along a plane oriented in the length direction of the core by means of a groove and guide system, and the locking element being assembled to the rear of the bottom and top elements along a plane that is inclined relative to the assembly plane of the bottom and top elements.

Whatever the embodiment, at least two of the elements may include a respective tapped hole in a longitudinal end for the purpose of co-operating with an extractor tool. Furthermore, the core may further comprise means for fastening the three elements to a plate of an injection mold. Alternatively, the three elements are designed to be held between the high and low portions of an injection mold.

The invention also provides an injection mold for making a composite material part having a closed box, the mold including a core as defined above.

BRIEF DESCRIPTION OF THE DRAWINGS

Other characteristics and advantages of the present invention appear from the following description made with reference to the accompanying drawings showing embodiments having no limiting character. In the figures.

DETAILED DESCRIPTION OF THE INVENTION

The invention applies to using a method of molding by injecting liquid resin that is known as resin transfer molding (RTM) for the purpose of fabricating any part made of composite material and having a closed portion in the form of a box, and in particular blade platforms for an aviation turbine engine fan.

Figure 1:
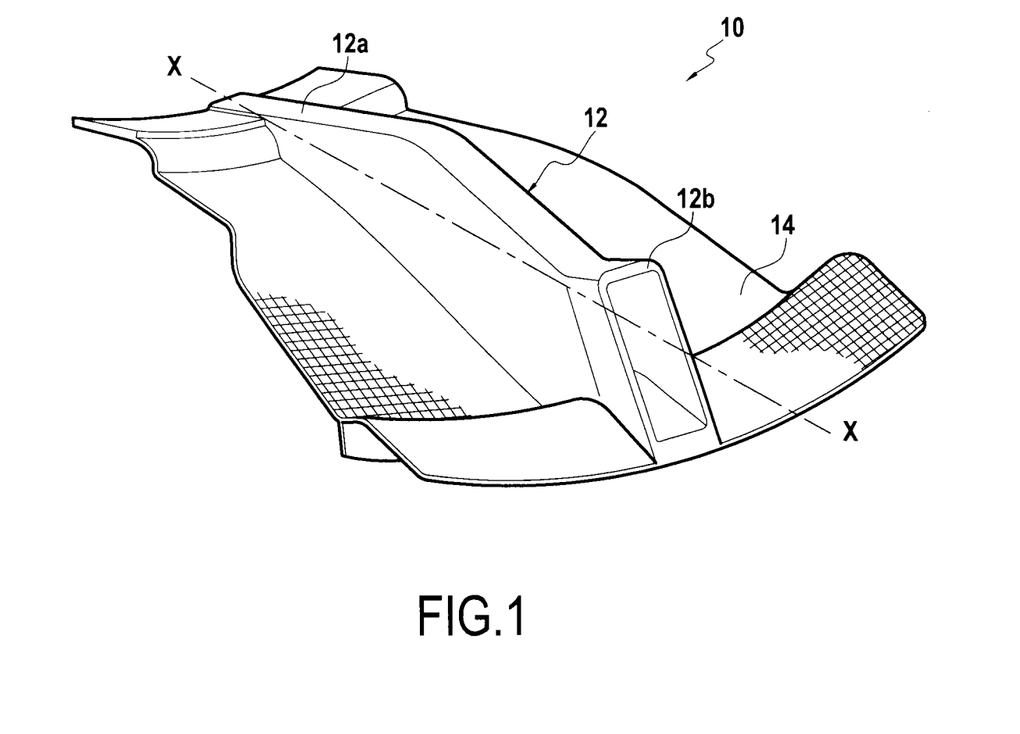
FIG. 1 is a perspective view of an example of a fiber preform to which the invention applies.

Fan blade platforms made out of composite material may be fabricated from a fiber blank that is woven as a single piece by 3D weaving and that is shaped in order to obtain a fiber preform such as that shown in FIG. 1, or they may be fabricated from an assembly of two 3D woven fiber blanks.

Reference may be made to Document WO 2013/160584, which describes making such a single-piece fiber blank that is obtained by 3D weaving in order to produce such a fiber preform. Typically, the fiber preform 10 is provided in particular with a box 12 that is said to be closed and that is positioned under the base 14 of the platform that serves to define the inside of the annular passage for admitting air into the fan.

More precisely, the box 12 is in the form of a central elongate pouch that extends longitudinally along an axis X-X from a closed end 12a to an open end 12b. The presence of such a box thus makes it possible to reinforce the mechanical strength of the blade preform.

After being shaped, the fiber preform 10 is positioned in the cavity of an injection mold (not shown) and the cavity is filled with epoxy resin so as to impregnate the preform. The resin is polymerized, thereby forming a matrix in which the preform is embedded and then at the end of injecting the resin, the temperature of the mold is lowered in order to unmold the part.

The injection mold used has a core (also referred to as a mandrel) associated with one of its plates for the purpose of being positioned inside the box 12 of the fiber preform 10. Such a core extends longitudinally along an axis Y-Y (FIG. 2) that corresponds substantially to the axis X-X of the box 12 of the fiber preform. The particular function of the core is to ensure that the box of the fiber preform is properly aligned inside the injection mold.

When blade platforms are obtained from an assembly of two 3D woven fiber blanks, that assembly is implemented around the core, when the core is in position in the injection mold.

Figures 2, 3A, 3B:
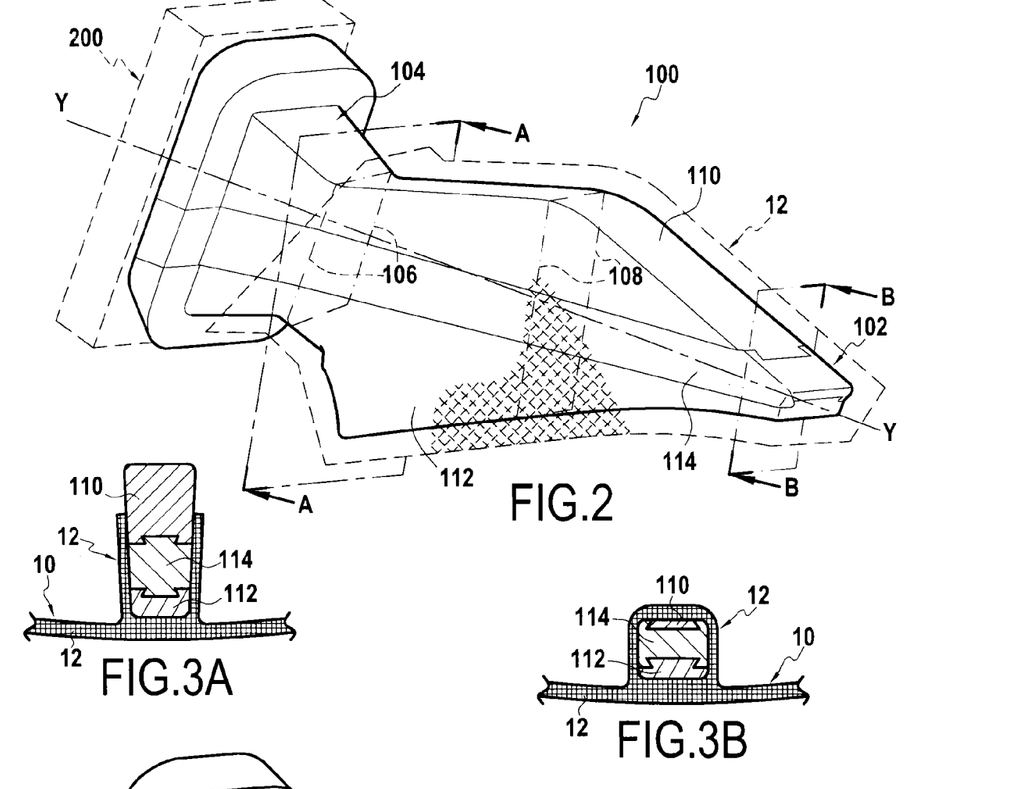
FIG. 2 is a perspective view of an injection mold core in an embodiment of the invention.
FIGS. 3A and 3B are section views of FIG. 2, respectively on section planes A-A and B-B.

As shown in FIG. 2, the core 100 is generally in the form of an elongate wedge of thickness that varies between an "insertion" first end 102 for insertion into the box and an "opening" second end 104, together with two substantially parallel longitudinal flanks.

It may be observed that the core 100 presents the feature of its opening right section (represented by the trapezoid 106 in FIG. 2 and corresponding to the section through which the core is extracted from the box of the fiber preform once it has been consolidated by resin) being of size that is smaller than its maximum right section (represented by the trapezoid 108).

Furthermore, at its opening end 104, the core 100 is designed to be fastened to a plate 200 of an injection mold for the fiber preform.

Figure 4:
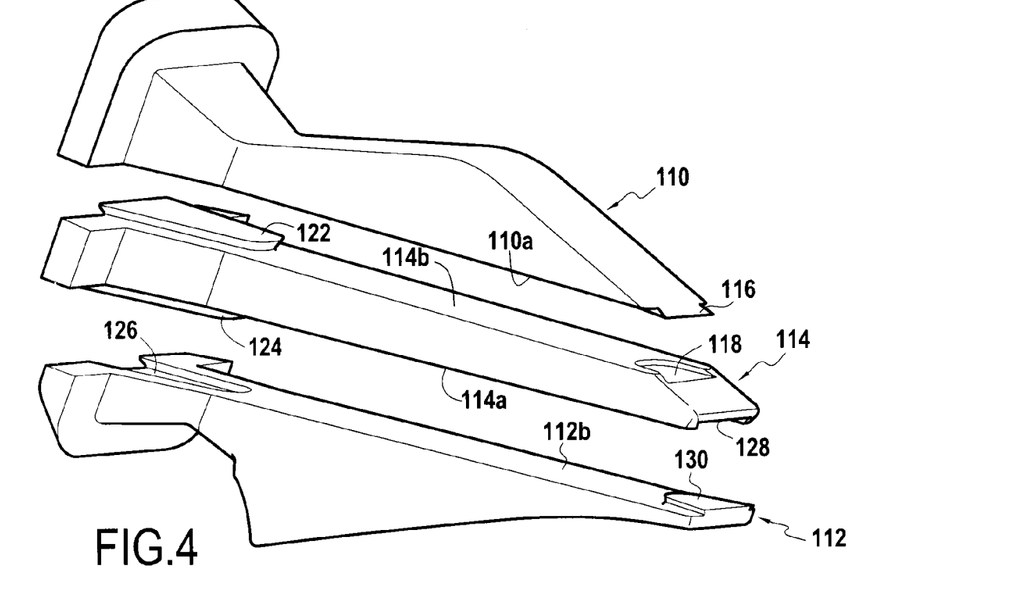
FIGS. 4 and 5 are exploded views of the FIG. 2 core.

In the invention, the core 100 is constituted by at least three distinct elements, that are assembled together, each extending over the entire length of the core, the elements comprising a top element 110, a bottom element 112, and a central element 114 that is assembled between the top and bottom elements (see in particular FIG. 4).

In the embodiment of FIGS. 2 to 5, these elements 110, 112, and 114 of the core are assembled together more particularly by means of dovetails.

Thus, the bottom surface 110a of the top element 110 of the core is provided at its end corresponding to the insertion end 102 of the core with a tenon 116 of trapezoid-shaped section for co-operating with a groove 118 of complementary shape formed in the top surface 114b of the central element 114.

Furthermore, at its end corresponding to the opening end 104 of the core, the bottom surface 110a of the top element 110 of the core is provided with a groove 120 (FIG. 5) for co-operating with a tenon 122 having a trapezoid-shaped section that is made on the top surface 114b of the central element 114.

Furthermore, the bottom surface 114a of the central element 114 of the core is provided at its end corresponding to the opening end of the core with a tenon 124 of trapezoid-shaped section for co-operating with a groove 126 of complementary shape formed in the top surface 112b of the bottom element 112.

Likewise, at its end corresponding to the insertion end of the core, the bottom surface 114a of the central element has a groove 128 for co-operating with a tenon 130 of trapezoid-shaped section formed on the top surface 112b of the bottom element.

Such an arrangement of dovetails enables the various elements 110, 112, and 114 of the core to be assembled together and also enables them to be extracted from the box of the fiber preform (once it has been consolidated by resin) in a specific order, beginning with the central element 114. This element is extracted from the box of the preform by exerting a rearward force along the longitudinal axis Y-Y (i.e. a force in a direction going from the closed end 12a of the box towards its open end 12b). This extraction may be assisted by means of an extractor tool (not shown in the figures) that co-operates with a tapped hole 135 (FIG. 5) formed in the rear end of the central element (i.e. at its end corresponding to the opening end 104 of the core).

Once the central element 114 of the core has been extracted from the box of the fiber preform, the other two elements 110 and 112 of the core are extracted, possibly with the help of the same extractor tool co-operating with tapped holes 134 and 136 formed in the rear end of the respective 110 and 112, i.e. at the proximal end of the core (the end closest to its opening section 106).

Figure 5:
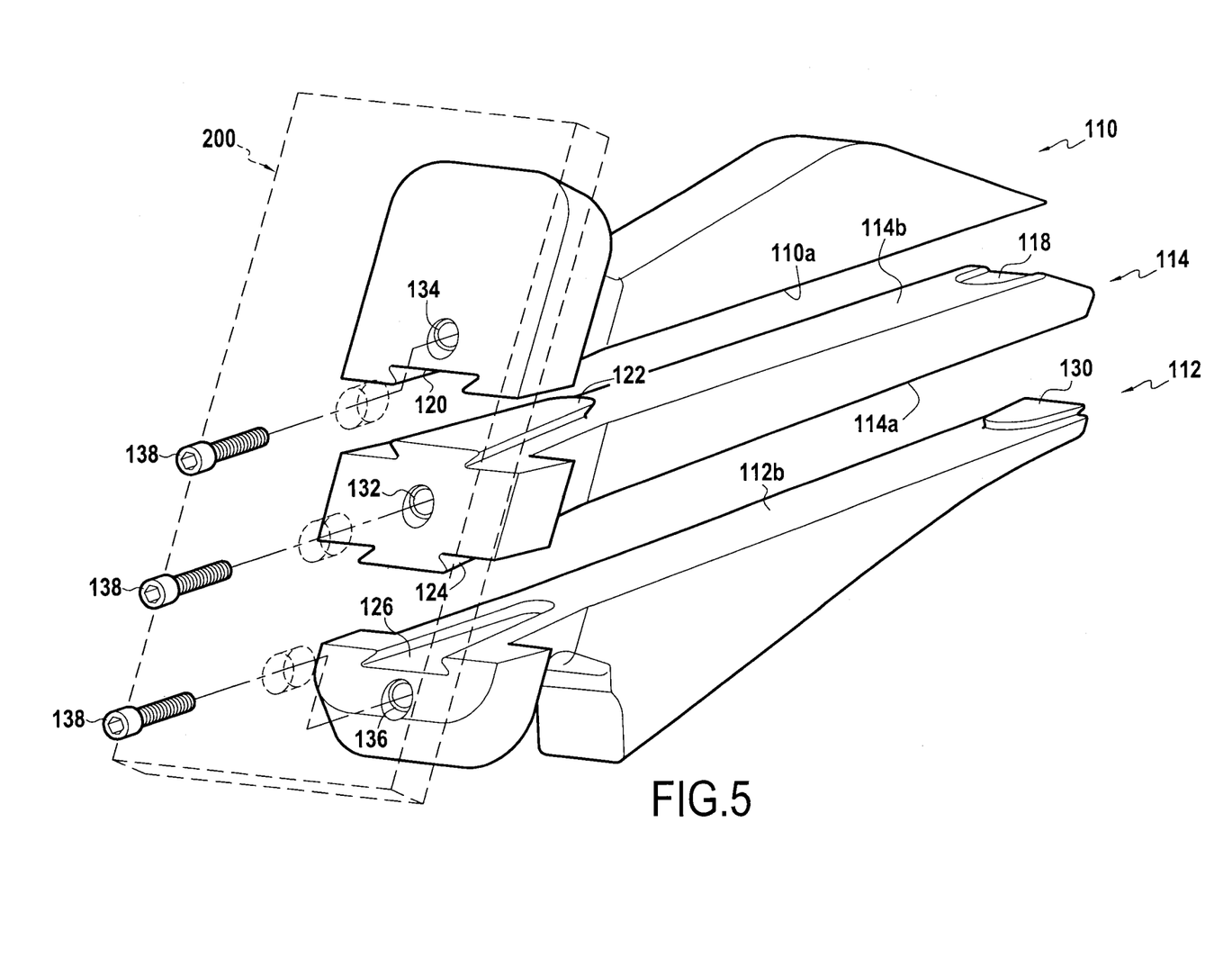

It may be observed that these tapped holes 132, 134, and 136 may also be used for mounting the core on a plate 200 of the injection mold, in particular by means of screws 138 (see FIG. 5). Alternatively, the core may be held firmly and directly between the high and low portions of the injection mold, without having recourse to being mounted on such a plate.

Figure 6:
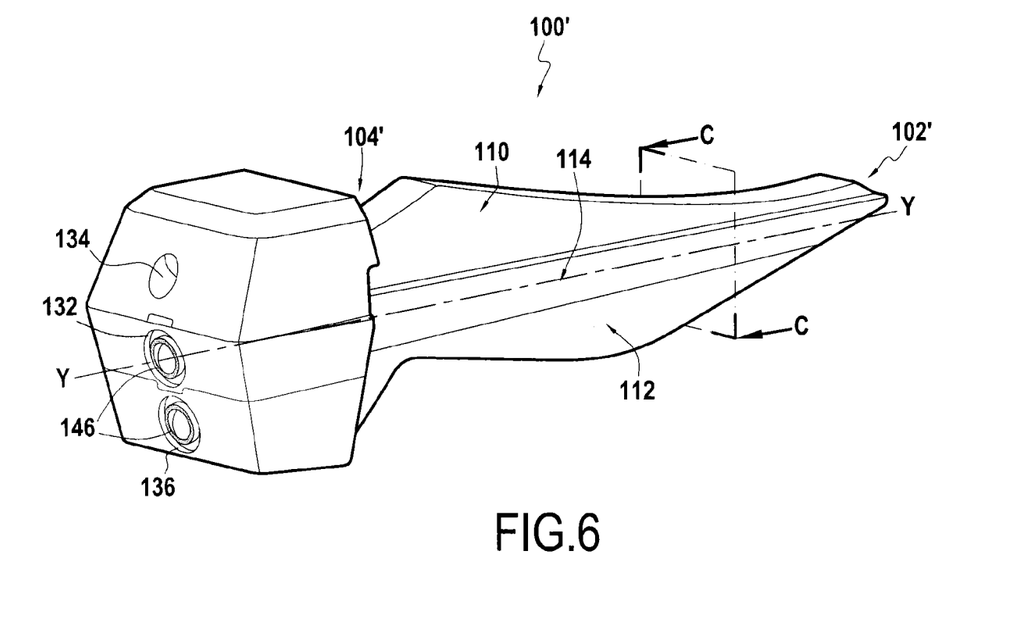
FIG. 6 is a perspective of an injection mold core in another embodiment of the invention.
Figure 7:
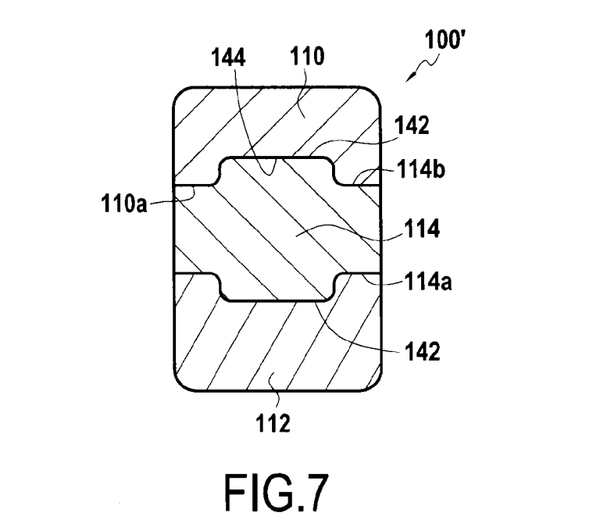
FIG. 7 is a section view of FIG. 6 on section plane C-C.
Figure 8:
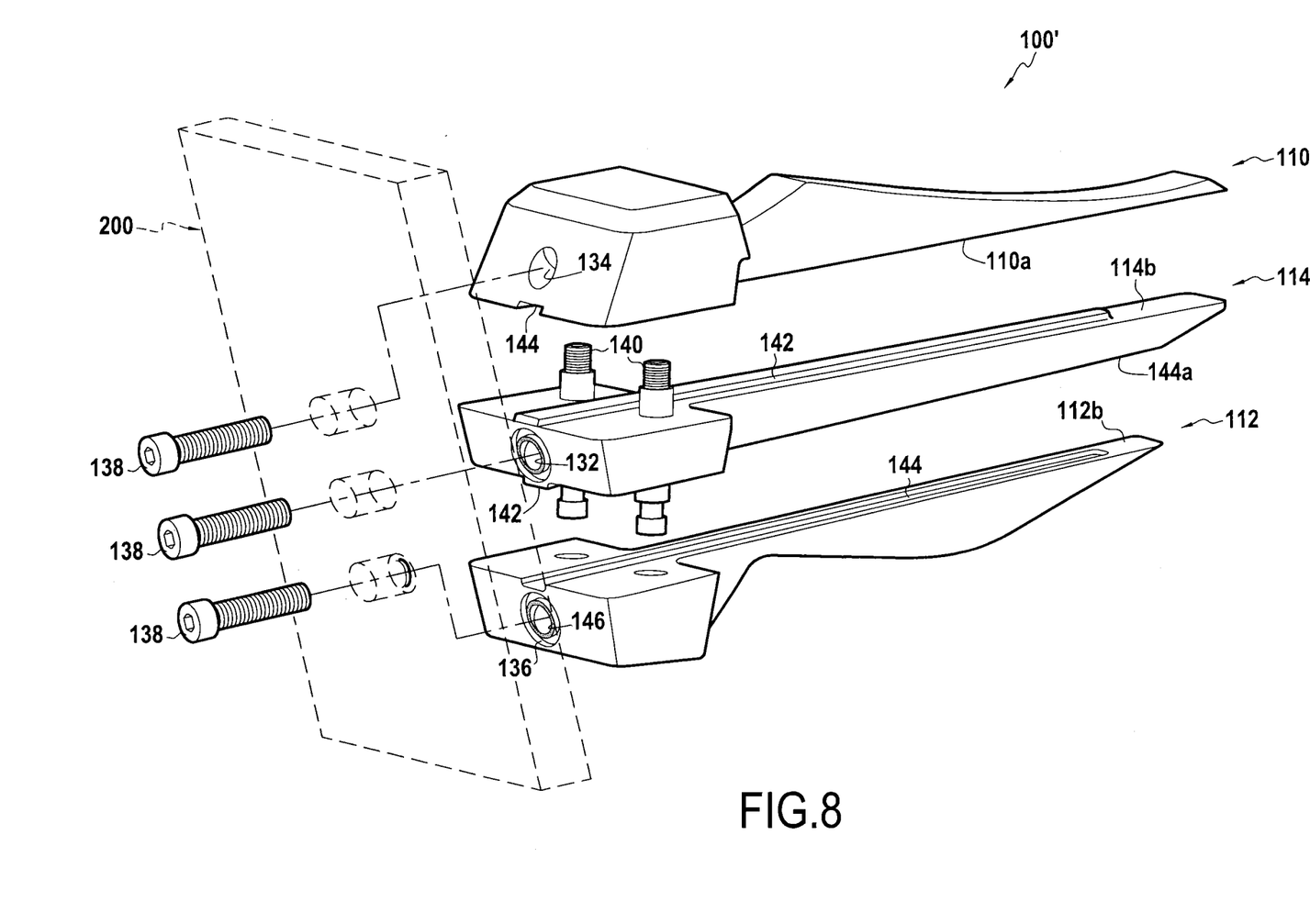
FIG. 8 is an exploded view of the FIG. 6 core.

FIGS. 6 to 8 show a core 100' in another embodiment of the invention in which the various elements 110, 112, and 114 of the core are assembled together by screws.

More precisely, and as shown in FIG. 8, two screws 140 pass through the bottom and central elements 112 and 114 of the core 100' at its opening end 104' (FIG. 6) in the thickness direction of the core (i.e. perpendicularly to the longitudinal axis Y-Y of the core). These screws 140 are screwed into the top element 110 of the core and thus enable all three elements of the core to be secured to one another.

Furthermore, the central element 114 of the core 100' carries a rectangular section rail 142 on each of its bottom and top surfaces 114a and 114b, which rails extend between the two longitudinal ends of the central element and co-operate with guides 144 of complementary shape formed firstly in the bottom surface 110a of the top element 110 and secondly in the top surface 112b of the bottom element 112, respectively.

The core 100' is extracted from the box of the fiber preform (once it has been consolidated by resin) in the same manner as for the above-described embodiment, namely the central element 114 is removed first, followed by the other two elements.

Furthermore, as in the above-described embodiment, the extraction of the elements of the core may be facilitated by using an extractor tool that co-operates with tapped holes 132, 134, 136 formed in the rear ends of the elements. These tapped holes may also co-operate with screws 138 for mounting the core on a plate 200 of the injection mold. Alternatively, the core may be held firmly and directly between the high and low portions of the injection mold, without having recourse to being mounted on such a plate.

Finally, at least some of these tapped holes may receive sealing gaskets 146 so as to avoid any resin infiltrating into the tapped holes (FIGS. 6 and 8).

Figure 9:
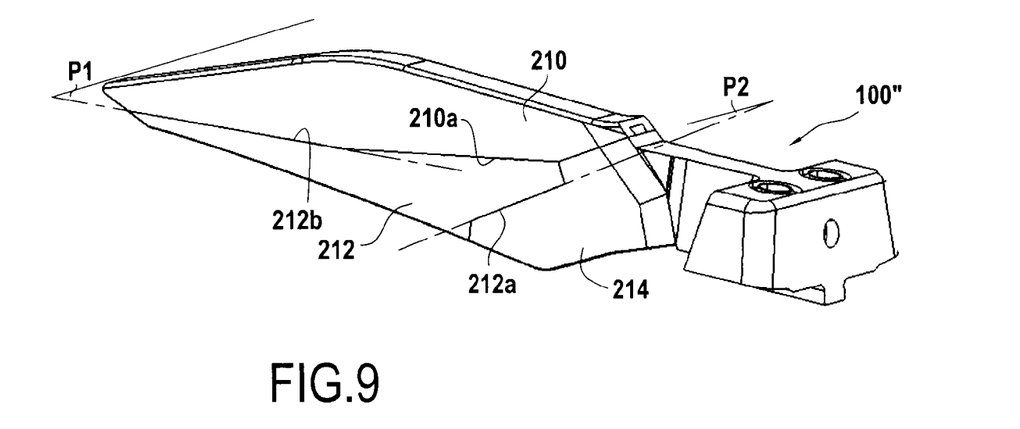
FIGS. 9 and 10 are perspective views of an injection mold core in yet another embodiment of the invention.
Figure 10:
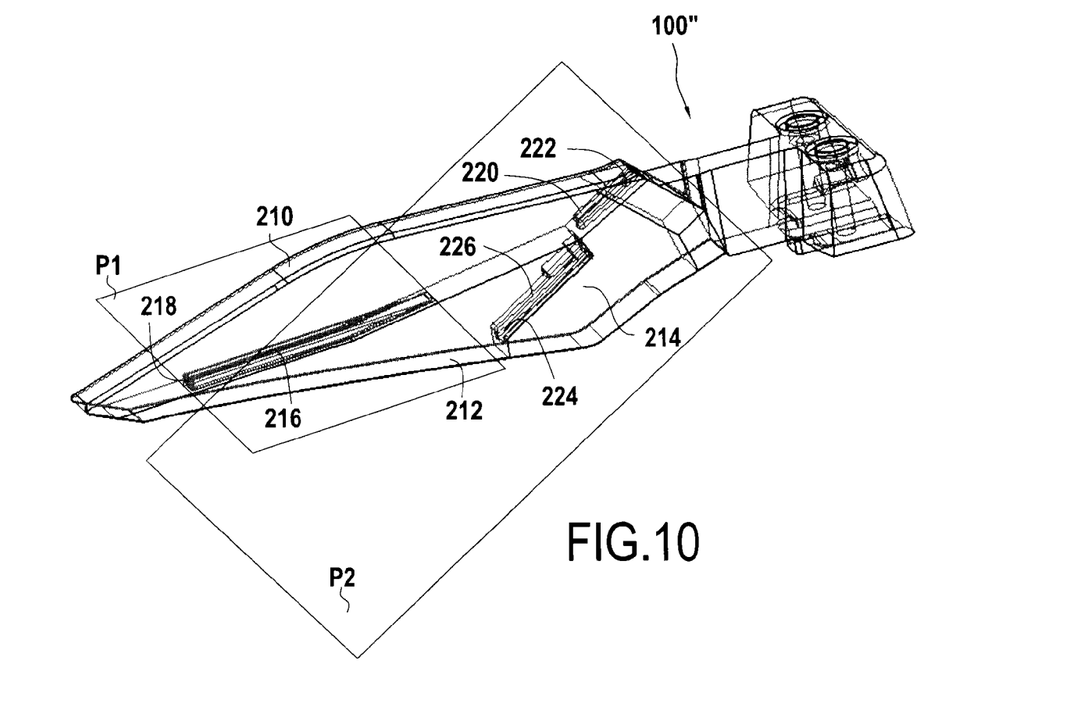

FIGS. 9 and 10 show a core 100" in yet another embodiment of the invention.

In this embodiment the core has a top element 210, a bottom element 212, and a locking element 214.

The top and bottom elements 210 and 212 are assembled together along a plane P1 that is oriented in the length direction of the core. By way of example, this assembly may be performed by means of a guide 216 carried by a top surface 212b of the bottom element 212 and co-operating with a groove 218 formed in a bottom surface 210a of the top element 210. Naturally, the arrangement of the groove and the guide could be inverted.

The locking element 214 is assembled to the rear of the top and bottom elements 210 and 212 (i.e. at the proximal end of these elements that is the closest to the opening section of the core) along a plane P2 that is inclined relative to the assembly plane P1 between the bottom and top elements.

Furthermore, the locking element 214 is assembled firstly to the top element 210 via a guide 220 co-operating with a groove 222 formed in the bottom surface 210a of the top element, and secondly to the bottom element 212 via a groove 224 co-operating with a guide 226 formed on the bottom surface 212a of the bottom element.

Furthermore, as in the preceding embodiments, extraction of the top and bottom elements 210 and 212 of the core can be facilitated by means of an extractor tool that co-operates with a tapped hole (not shown) formed in the rear of the bottom element and another extractor tool that co-operates with the groove 222 formed in the bottom surface 210a of the top element at its rear end.

The invention claimed is:

1. An injection mold core for making a composite material part having a closed box, the core being in the shape of a wedge that is to be inserted inside a closed box of at least one fiber preform into which a matrix-precursor fluid is to be injected, the core presenting both an opening right section through which the core is to be unmolded from the box of the preform after the matrix has set, and also a maximum right section of greater size than the opening right section, the core comprising at least three distinct elements that are assembled together, each core element presenting a maximum right section of size that is smaller than the opening right section, wherein the core comprises a top element, a bottom element, and a locking element, the bottom and top elements being assembled together along a plane oriented in the length direction of the core by means of a groove and guide system, and the locking element being assembled to the rear of the bottom and top elements along a plane that is inclined relative to the assembly plane of the bottom and top elements.

2. A core according to claim 1, further comprising means for fastening the three elements to a plate of an injection mold.

3. A core according to claim 1, wherein the three elements are designed to be held between high and low portions of an injection mold.

4. A core according to claim 1, wherein at least two of the elements include a respective tapped hole in a longitudinal end for the purpose of co-operating with an extractor tool.

5. An injection mold for making a composite material part having a closed box, the mold including a core according to claim 1.

* * * * *